Figure 1:
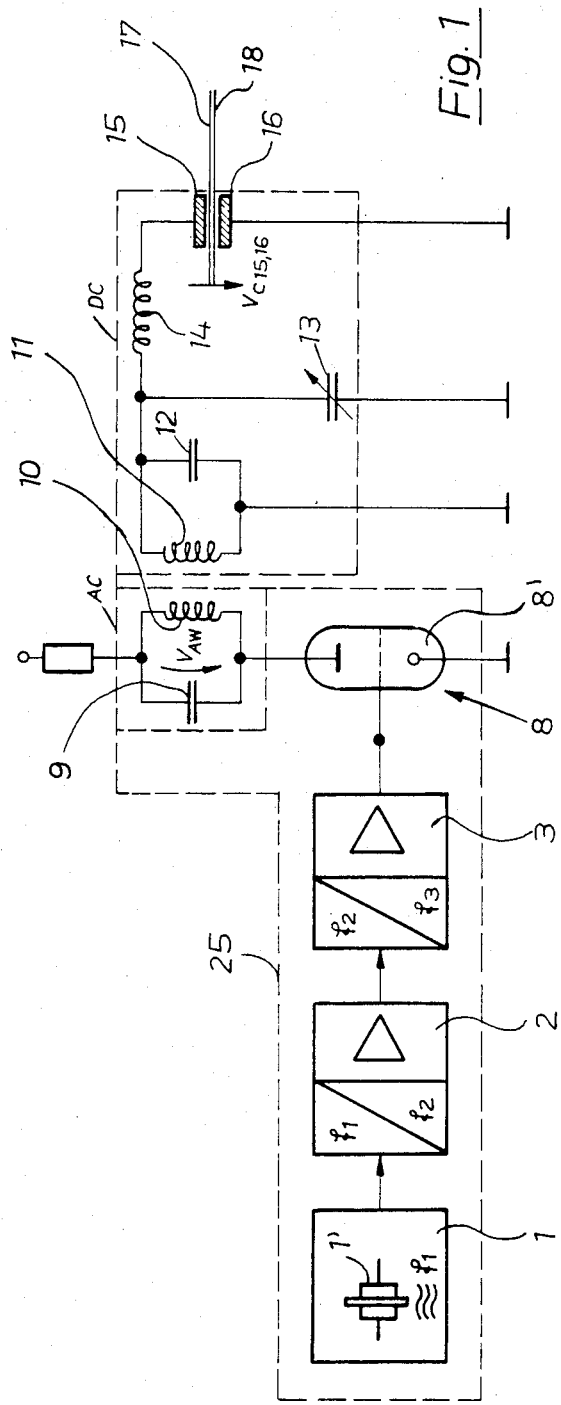

United States Patent [19]

Krause

[11] Patent Number: 4,504,720
[45] Date of Patent: Mar. 12, 1985

[54] HIGH FREQUENCY GENERATOR FOR WELDING APPARATUS

[75] Inventor: Erich Krause, Ludwigsburg, Fed. Rep. of Germany

[73] Assignee: PKM Projektionsgesellschaft, Ludwigsburg, Fed. Rep. of Germany

[21] Appl. No.: 583,796

[22] Filed: Mar. 1, 1984

Related U.S. Application Data

[63] Continuation of Ser. No. 277,718, Jun. 26, 1981, abandoned.

[30] Foreign Application Priority Data

Jun. 30, 1980 [DE] Fed. Rep. of Germany ....... 3024753

[51] Int. Cl.³ .............................................. H05B 6/06
[52] U.S. Cl. .............................. 219/10.77; 219/10.53; 219/10.81; 331/158
[58] Field of Search .............. 219/10.77, 10.75, 10.53, 219/10.81; 331/158

[56] References Cited

U.S. PATENT DOCUMENTS

| 2,516,324 | 7/1950 | Joy ..................................... 219/10.77 |
| 2,548,246 | 4/1951 | Walstrom ........................... 219/10.77 |
| 3,025,476 | 3/1962 | Chow .................................... 331/158 |
| 3,169,230 | 2/1965 | Tibbs .................................. 219/10.77 |
| 4,274,066 | 6/1981 | Yoshisata ............................. 331/158 |

FOREIGN PATENT DOCUMENTS 731950  6/1955  United Kingdom ............. 219/10.75

Primary Examiner—Roy N. Envall, Jr.
Assistant Examiner—Marvin M. Lateef
Attorney, Agent, or Firm—Louis Orenbuch

[57] ABSTRACT

A high frequency welding device for welding plastic sheets, in which the high frequency energy is provided by fixed-frequency oscillator, preferably by using a quartz crystal amplifier, whose frequency does not change during the welding process. The output circuit is designed to have a resonance curve which, before the occurence of any change in the output and coupling circuit characteristics due to the welding process, intersects with the fixed frequency of the oscillator at a "operating point" which is on the slope of the resonance curve descending to lower frequencies. The circuit components are selected to behave in such a manner that the resonance curve undergoes a shift toward lower frequencies, with the fixed-frequency "operating point" rising across the peak of the resonance curve to a point on the slope of the curve descending to lower frequencies, as the welding process progresses.

2 Claims, 6 Drawing Figures

HIGH FREQUENCY GENERATOR FOR WELDING APPARATUS

This application is a continuation of application Ser. No. 277,718, filed June 26, 1981, now abandoned.

DESCRIPTION

The invention concerns a high frequency generator of the type indicated in the concept of patent claim 1.

According to the current regulations of the German Postal System, high frequency-driven welding units such as, e.g., plastic sheet welding units may be driven only at certain allowed frequencies—among others, at a frequency of 27.12±0.6 MHz or at a frequency of 40.68±0.05% MHz. The higher frequency should in general be favored, since friction may be induced more rapidly at the higher frequency among the individual molecules of the material to be welded, and the latter therefore heated more quickly. In other words, the higher frequency makes it possible to introduce more energy into the material within a given period of time. This is particularly important since the voltage between the electrodes may be increased only to a limited degree; otherwise, the danger of arc-throughs arises, particularly when dust particles reach the welding site. In this case it is often possible to weld at the higher frequency using methods with cold electrodes, which at the lower frequency necessitate preheating the electrodes, and nevertheless to achieve short cycle times.

However, when the higher frequency is used the following difficulties arise: for one thing, the cited regulations of the German Postal System require very high stability (±0.05%) in the frequency employed. With conventional high frequency generators, i.e., ones of the same design as those used at the lower frequency of 27.12 MHz, this may be achieved only with some difficulty, since self-oscillating oscillators are used without exception in the conventional high frequency generators. However, since the capacitance between the electrodes varies during the welding process—inevitably—as a result of its influence on the material, and consequently the resonant frequency of the decoupling circuit and—influenced by the latter—that of the anode circuit vary, with a self-oscillating high frequency generator this means that its frequency also exceeds its stated limits of permissibility.

In addition, the difficulty arises of introducing sufficient energy into the material to be welded. This is first of all, as mentioned, a result of the fact that the voltage between the electrodes may not be increased without limit. On the other hand, due to the coupling of the decoupling circuit and the anode circuit, as the capacitance between the electrodes varies during the welding process it is also impossible to avoid a change in the resonant frequency of the anode circuit. Operating at a fixed frequency in the oscillation-generating section of the high frequency generator, the dificulty would therefore arise that as the resonant frequency of the latter changed, it would very quickly "run away" from the fixed frequency, with the result that sufficiently high power would be available in the anode circuit only for a short period. In other words, working at a fixed frequency to fulfill the above-cited requirements for accuracy contradicts the goal of introducing as much energy as possible into the material to be welded.

A high frequency generator of the type cited at the beginning has become known from German Patent Specification No. 10 26 410. It is provided there that the resonant frequency of the decoupling circuit (load circuit La) exceeds that of the anode circuit (oscillator circuit S) to such a degree that the operating point of the high frequency generator is constantly in the flat region on the side (op. cit., column 3, line 66), despite a shift during the welding process. As a result of a given change in frequency, only a relatively small change in voltage is produced, so fluctuations in the power output may be suppressed in this manner (op. cit., column 3, line 68). The high frequency generator described there operates as a "free oscillator", i.e., as a result of the varying capacitance between the welding electrodes during the welding process, its frequency is dependent upon the latter. This is a consequence of the coupling of the decoupling circuit, of which the welding electrodes are a part, to the anode circuit and the dependency of the frequency of the high frequency generator upon the reactances in the anode circuit. Frequency variation therefore occurs here during the welding process, with the above-mentioned disadvantages, as a result of the fact that a free-oscillating oscillator is employed.

A free-oscillating high frequency generator has also become known from the publication, "75 Years of Lorenz 1880-1955, Commemorative Volume of the C. Lorenz Corp.", 1955, page 170. In this case the resonance curve of the decoupling circuit (load circuit) is no longer considerably above the resonance curve of the anode circuit as in the case of the type of high frequency generator on which the invention is based; rather, the two are close to one another, so that the resonance curve of the decoupling circuit (load circuit) runs into the resonance area of the anode circuit during the welding process, with the result that the power decoupled from the anode circuit into the decoupling circuit increases during the welding process (page 170, right hand column, line 15). However, this does not alter the fact that the frequency of the oscillator itself, since the oscillator under consideration is free-oscillating, is constantly in resonance with the anode circuit, and even when this varies, and because the anode circuit is coupled to the decoupling circuit, the reactances of the latter vary for their part. Also present here during the welding process, therefore, is a frequency variation which is passed forward by the change in the reactances of the anode circuit. The subject of the publication cited is the relation of this varying oscillator frequency to the resonance curve of the coupled load circuit.

With these high frequency generators, in which the resonance curves of the anode circuit and the decoupling circuit lie close to one another, the difficulty already mentioned above exists, that a shift in the operating point along the steep region of the resonance curve leads to very severe fluctuations in output power; in particular, there is danger of voltage arc-throughs when great increases in voltage occur. Thus, it is also pointed out in the publication cited (page 170, right hand column, line 25) that in practical applications automatic frequency trimming of the matching device must be employed, which leads, however, to long welding times of ca. 3-4 seconds.

From U.S. Pat. No. 3,169,230 a high frequency generator has become known in which the decoupling is effected by means of a resonant cavity that is varied by motor at a certain frequency. As a result of this variation, changes in voltage occur as positive feedback into the anode circuit takes place (see FIG. 3); in this manner the anode circuit is readjusted. Thus, in this case also, operation occurs with variable anode circuit frequency. The same also applies to the high frequency generator of Disclosure No. 15 40 812; the oscillator under consideration in this case is also free-oscillating.

Consequently, it is the task of the present invention to create a high frequency generator for welding units, in particular, plastic sheet welding units of the type cited at the beginning, which makes possible operation at a high frequency in close tolerances and thereby ensures that, despite the variation in resonant frequency of the anode circuit during the welding process as a result of its coupling with the decoupling circuit, a maximally constant voltage over the electrodes is available for welding during an entire welding cycle. Here "constant" means that the voltage—as a result of a "runaway" of the resonant frequency of the anode circuit—is not only available for surges; a high voltage suitable for welding should be delivered during the entire welding cycle, the duration of which is selectable. The voltage should preferably increase somewhat after the beginning of the welding process, then reach its highest value, and thereafter fall again somewhat, but to a value that is still considerably above zero.

The invention is worked out by the chracteristics presented in the distinctive features of patent claim 1. The invention also concerns several advantageous advances.

The basic idea of the invention consists on the one hand of employing a fixed frequency in the oscillator section of the high frequency generator, preferably making use of a quartz-controlled oscillator, and then detuning the anode resonant circuit of the final stage relative to this fixed frequency preferably by a half bandwidth toward the higher frequency. Then the other circuit parameters, e.g., the frequency difference between the anode circuit and the decoupling circuit, may be so chosen that the displacement of the resonant frequency of the anode circuit during welding is only one bandwidth. This results in the operating point of the anode circuit (at the fixed frequency) at first lying on the left side (toward the lower frequencies) of the resonance curve of the anode circuit, then rising on the latter, and then falling again on the right side (toward the higher frequencies). It follows that the welding process begins with a certain voltage value, then climbs to a maximum, and then decreases again to a certain non-zero value. This voltage course is particularly advantageous. At the initial value, which does not yet represent the maximum, preheating of the material occurs; then the maximal entry of energy, and thereafter a decline. In this manner a maximum amount of energy can be put into the material. In addition, a fixed frequency may be employed in the oscillator section in such a manner that the tolerances presented in the postal regulations may be observed.

The subject of the present application therefore differs from the technological developments cited (German Patent Specification No. 10 26 410; "75 Years of Lorenz", pages 170–171; U.S. Pat. No. 3,169,230; and German Disclosure No. 15 40 812) in that the oscillator (the oscillation-producing section of the high frequency generator) operates at a fixed frequency. This happens, by way of example, as a result of the fact that, as provided in a favorable advancement of the invention, the oscillator stage is quartz-controlled. This frequency also remains the same when the resonant frequency of the anode circuit varies during the welding process; however, the change in resonant frequency in this case is a variation in the properties of the anode circuit, not a change in the frequency at which the oscillator stage acts upon this anode circuit. At a fixed oscillator stage frequency, the operating point of the latter is so placed that the stated fixed frequency at which the oscillator stage is driven lies on the side of the anode circuit resonance curve descending toward lower frequencies. This is not the case with all the high frequency generators discussed above, since they all oscillate freely, i.e., they adjust themselves such that the frequency at which the oscillator stage operates is the resonant frequency of the anode circuit, which varies over the coupling of the latter to the decoupling circuit during the welding process.

Figure 2:
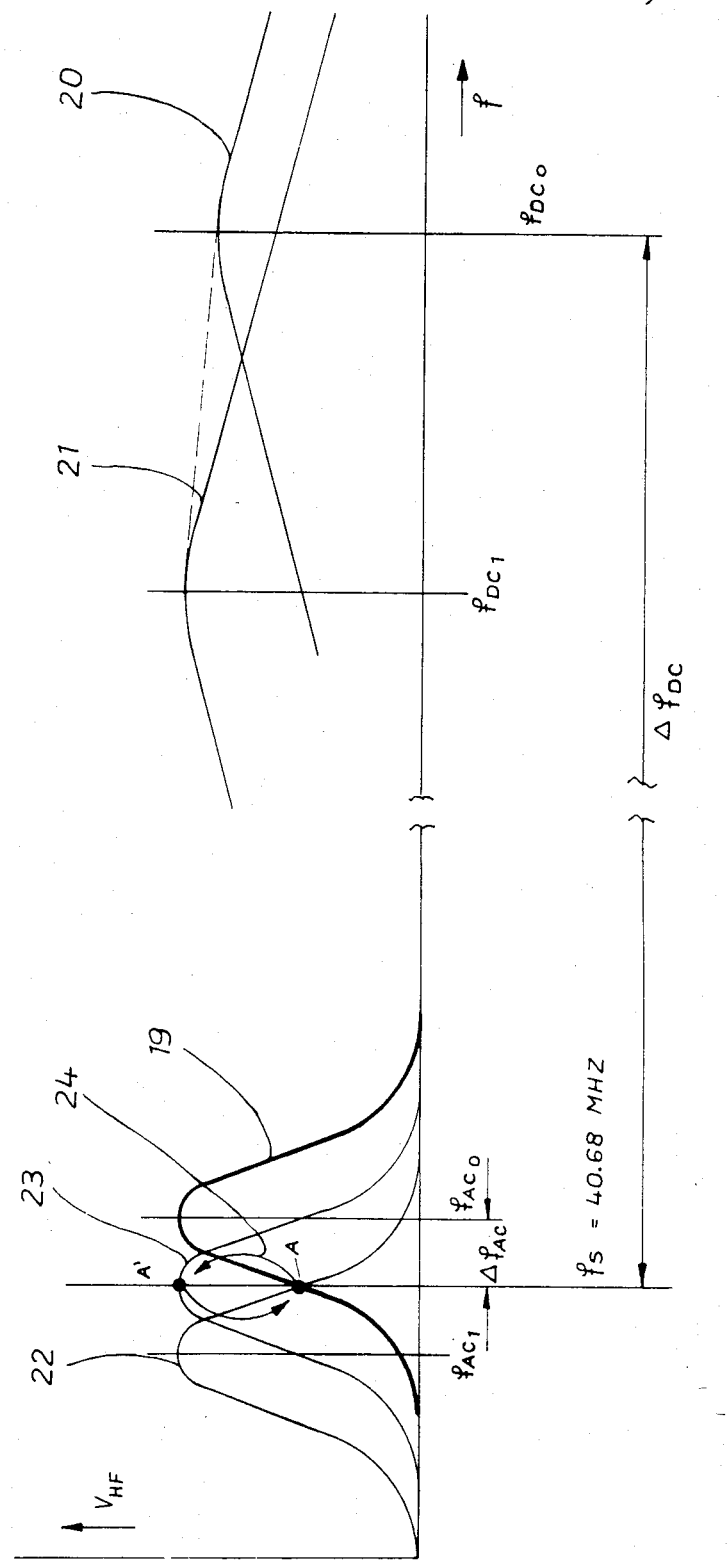

The result is thereby achieved, that the variation of the anode circuit resonant frequency (always at a fixed oscillator stage drive frequency) is such that it shifts during the welding process over the peak of the resonance curve onto the side descending toward lower frequencies [Tr: sic] (see FIG. 2). The result is thereby obtained, both that excessive voltage variations do not occur at the welding site during the welding process, so that the danger of arc-throughs, etc., does not arise, and that a maximum amount of energy enters the material to be welded within a very short period (ca. 0.2 seconds).

The peculiarity of the invention therefore lies in the fact that the oscillator, i.e., the entire oscillation-generating section, is driven at a fixed frequency, in departure from all existing technological developments, and, at the same time, that the variation in the electrically characteristic properties in the output circuit of the final stage (anode circuit, decoupling circuit) during the welding process as a result of the effect of the welding process on the material to be welded is used in such a manner that a maximally constant, but on the other hand maximally intensive, energy transfer into the latter results. This is brought about by selecting the operating point of the drive frequency on the resonance curve of the anode circuit in the condition in which no welding has yet taken place.

Figure 1A:
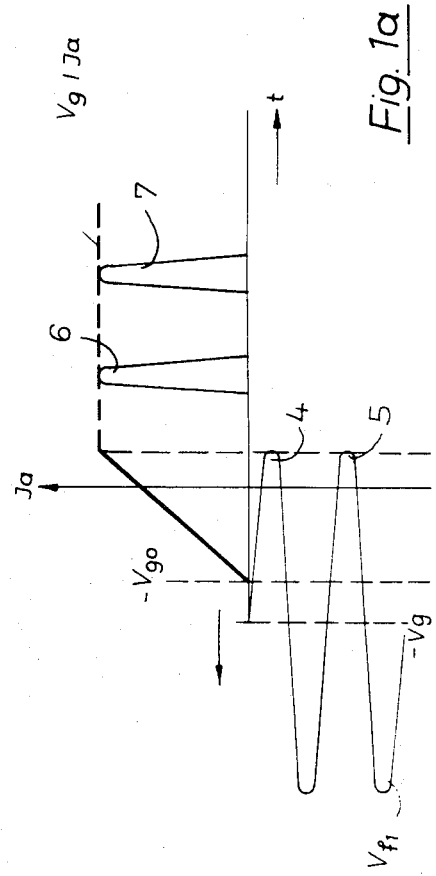
Figure 3:
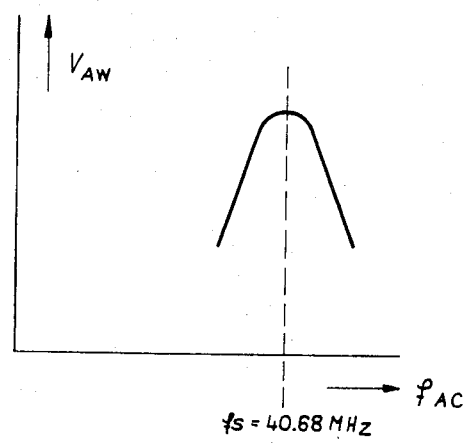
Figure 4:
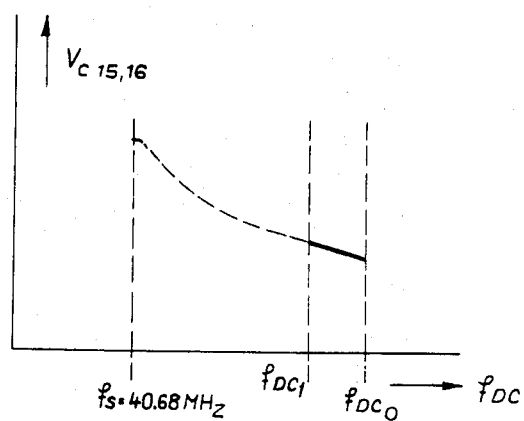
Figure 5:
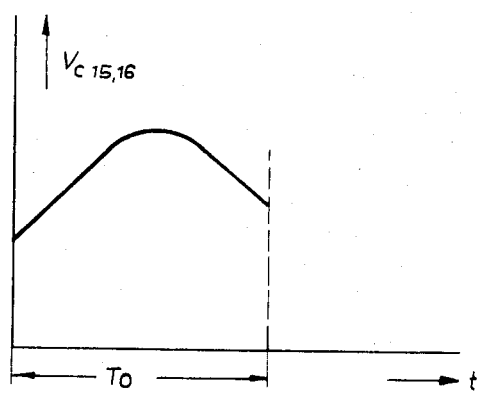

An example realization of the invention is described in the following. References are made therein to the attached illustrations. Represented are:

FIG. 1—an example realization;

FIG. 1a—schematically, the method of operation of an amplifier/frequency multiplier operating in class C;

FIG. 2—the change in the resonance curves of the anode circuit and the decoupling circuit;

FIG. 3—the course of voltage in the anode circuit as a function of the change in resonant frequency of the latter brought about by the welding process;

FIG. 4—the course of voltage between the electrodes as a function of the change in resonant frequency of the decoupling circuit brought about by the welding process, at constant anode circuit amplitude; and FIG. 5—the course of voltage between the electrodes during the welding process.

The high frequency generator in FIG. 1 exhibits a quartz-controlled oscillator stage. It generates a certain frequency $f_1$. The element that determines the frequency is a quartz crystal 1'. The frequency is therefore extremely stable. Quartz-controlled oscillators of this type are known in themselves, so their symbolic representation is sufficient, and further description is not required. The important point is that when an element such as a quartz crystal is used that stabilizes oscillation to an extremely high degree, extremely stable oscillation is generated. The oscillation is generated first at a lower frequency $f_1$, which is brought to the desired nominal frequency of $f_S=40.68$ MHz in the subsequent amplifier stages 2, 3 by frequency doubling, repeated as necessary. This frequency $f_1$ of the quartz-controlled oscillator stage might be 5.0850 MHz, as an example, so the desired fixed frequency $f_S=40.68$ MHz would be produced after three doublings [Tr: sic] in the subsequent amplifier stages 2 and 3. The reason for this type of frequency generation by multiple frequency doubling is that frequency generation from the size of the construction components can be better controlled at a lower frequency, and undesired destabilizing feedback as a result of the frequency doubling stages cannot occur.

Following the quartz-controlled oscillator stage 1 are two amplifier stages 2 and 3, in each of which, as already mentioned, amplification and frequency doubling occur. This takes place in a manner known in itself, which requires only brief explanation with the help of FIG. 1a. The amplifying tubes of the amplifier operate in class C, i.e., the bias grid voltage ($V_{g0}$) is sufficiently negative that only the voltage peaks 4 and 5 of the oscillating voltage $V_{f1}$ to be amplified at the frequency $f_1$ are amplified and lead to corresponding current pulse peaks 6 and 7 in the output circuit. If in the anode circuit there is an oscillator circuit which is tuned to the doubled frequency, it is sequenced by the current pulses 5 and 6, which have a high harmonic component.

The final stage 8 is formed by a tube 8'. It functions as a high frequency power amplifier in class C and is set to the frequency $f_S=40.68$ MHz in order to achieve a high degree of efficiency. It therefore does not function as a frequency doubling stage. In its anode circuit AC are the capacitance 9 and the coil 10. These result in a parallel oscillating circuit. The power developed in the latter is delivered by inductive coupling of coil 10 to a coil 11, which is part of a decoupling circuit DC, which exhibits in addition to coil 11 another fixed capacitance 12, a variable capacitance 13, an energy conductor 14 with a predominant inductive component, and the welding electrodes 15 and 16, which likewise form a capacitance. Between the welding electrodes 15 and 16 occurs the welding, e.g., the welding of foils 17 and 18. When the foils 17 and 18 are placed between the welding electrodes 15 and 16, the latter are pressed against each other; then the welding process takes place upon application of high frequency.

As represented in FIG. 2, the anode circuit AC formed by capacitance 9 and coil 10 is designed such that its resonant frequency is not equal to the permanently set frequency $f_S=40.68$ MHz. Rather, the frequency of the anode circuit AC is tuned to a value $f_{AC0}$ which is approximately half a bandwidth higher than the fixed frequency $f_S$. The subscript 0 in the frequency representation $f_{AC0}$ indicates that reference is made to the frequency of the anode circuit under the condition in which the welding electrodes 15 and 16 are pressed against each other but welding has not yet occurred. The resonance curve of the anode circuit in this condition is represented in FIG. 2 by curve 19. It is symmetrical to the frequency $f_{AC0}$. The following equation therefore applies:

$$f_{AC0}=f_S+\Delta f_{AC}$$

Here $\Delta f_{AC}$, as already mentioned, is by way of example equal to half the bandwidth of the anode circuit. In the example realization $\Delta f_{AC}=25$ kHz. The operating point, as long as the welding process has not taken place, is therefore point A on curve 19. It is located on the side of resonance curve 19 declining toward lower frequencies.

The resonant frequency of decoupling circuit DC, which decouples the energy from the anode circuit AC to the welding site between the electrodes 15 and 16, is $f_{DC0}$. Here as well, the subscript 0 means that this frequency is given when the welding electrodes 15 and 16 have already been pressed against each other but welding has not yet taken place. The frequency $f_{DC0}$ is greater by a certain amount than $f_S$; therefore the equation $$f_{DC0}=f_S+\Delta f_{DC}$$

applies. Here $\Delta f_{DC}$ is approximately 2–3 MHz, much greater than $\Delta f_{AC}$.

Curve 20 is correspondingly the resonance curve of decoupling circuit DC at the frequency $f_{DC0}$.

When a welding process occurs, electrodes 15 and 16, as already mentioned, are moved toward each other and press foils 17 and 18 together between themselves. In the welding process the molecules of the material of foils 17 and 18 undergo correspondingly rapid polarity reversal under the action of the high frequency, resulting in friction against one another and therefore the development of heat. The foils are thereby welded together.

In the course of the welding process the capacitance $C_{15,16}$ between the electrodes 15 and 16 also changes. This change in capacitance brings about a change in the resonant frequency of the decoupling circuit DC from $f_{DC0}$ to $f_{DC1}$, as represented by curve 21. Curve 21 is the resonance curve of the decoupling circuit DC, as produced during the welding process as a result of this change. As an example, the frequency change during the welding process might be 500 kHz. This quantity is dependent upon the thickness of the foil, the surface of the electrodes, the material of the electrodes, etc.

As a result of the inductive coupling between coil 11 (a component of decoupling circuit DC) and coil 10 (a component of anode circuit AC), the resonant frequency of anode circuit AC shifts from $f_{AC0}$ (curve 19) to $f_{AC1}$ (curve 22) with a displacement of the resonant frequency of the decoupling circuit from $f_{DC0}$ to $f_{DC1}$. Due to the great difference between frequency $f_{DC0}$ and frequency $f_{AC0}$ and their low coupling factor, the frequency shift ($f_{AC0}-f_{AC1}$) of the anode circuit AC is very much smaller than the frequency displacement ($f_{DC0}-f_{DC1}$) of the decoupling circuit DC.

Consideration of the displacement of curve 19 to curve 22, corresponding to a shift of the resonant frequency of the anode circuit from $f_{AC0}$ to $f_{AC1}$, where the fixed frequency $f_S$ lies between $f_{AC0}$ and $f_{AC1}$, shows that operating point A also changes with this displacement, i.e., the voltage is changed which develops at the anode circuit AC at the frequency $f_S$ and which, after decoupling over the decoupling circuit DC, finally forms the voltage $V_{C15,16}$ which is available at welding electrodes 15 and 16 for welding. When the resonance curve of the anode circuit in FIG. 2 moves to the left (from 19 to 22), the operating point on the left side of the resonance curve shifts upward. Between curves 19 and 22, the curve reaches the position marked 23, at which the resonant frequency of the anode circuit is equal to the permanently set sender frequency $f_S$. Then the operating point lies at point A', accordingly reaching its maximum value. Thereafter, the operating point falls again on the right side of the resonance curve to the value A. This course is indicated in FIG. 2 by the arrows 24. This means that the alternating voltage $V_{AW}$ that develops at the anode circuit AC first increases and then again decreases. This process is schematically represented in FIG. 3 as a function of the difference ($f_{AC0}-f_{AC1}$).

This process just described is of extreme importance. As a result of the fact that the resonant frequency of the anode circuit is displaced upward relative to the permanently set frequency $f_S$, the shift in the resonant frequency of the decoupling circuit—which cannot be avoided—leads first to an increase in the voltage delivered by the high frequency generator to the electrodes up to a maximum value, and then again a decrease back to its initial value. This course may be characterized as decidedly optimal, and "constant" in the sense of the task set. An extremely favorable conversion of high frequency energy into heat energy is thereby produced in the material to be welded.

In order to achieve the desired course of the displacement of the resonant frequency of anode circuit AC, the difference ($f_{DC0}-f_{AC0}$) between the latter and the resonant frequency of the decoupling circuit and the coupling between coils 10 and 11 as well, the quality of the circuit, and the other circuit parameters must be appropriately established. These values are determined in a particular case by testing. Expressed negatively, the following must be ensured: if the coupling between anode circuit AC and decoupling circuit DC is too strong, or their frequency difference too small, the change in capacitance between the electrodes 15 and 16 during the welding process will accordingly bring about a considerably greater displacement of the resonant frequency of the anode circuit AC. Thereby only a brief passage of the resonant frequency of the anode circuit through the frequency $f_S$ is produced, and consequently only a brief welding pulse between the welding electrodes. This is undesirable. In addition, if the resonant frequency of the anode circuit $f_{AC0}$ were equal to the sender frequency $f_S$, a large current surge would be delivered at the beginning; then a very severe decline in voltage would occur, so that practically no "preheating period" would be provided to the material to be welded together before the voltage reached its maximum, which could lead to undesired arc-throughs or surface fires. If $f_{AC0}$ is too far from $f_S$, too low an initial electrode voltage is produced, which is insufficient for both preheating and welding the foils. Consequently the desired change in the resonant frequencies of the decoupling circuit DC and the anode circuit AC does not occur. Therefore, the sender also remains in this condition.

Care should also be taken in determining the frequency difference ($f_{DC0}-f_{AC0}$) that with decreasing frequency difference as a result of the displacement of the resonant frequency of the decoupling circuit DC from curve 20 to curve 21 during the welding process, the increase in voltage in the decoupling circuit (over electrodes 15 and 16) which is attributable to a reduction in the frequency difference does not become too steep. This is represented in FIG. 4. The voltage over the electrodes is marked $V_{C15,16}$. It should have the weak increase shown in FIG. 4, preferably to 1.5 times its initial value. Excessively high voltages are undesirable since they can lead to arc-throughs.

In order to achieve this condition, it turns out to be experimentally advantageous if the coupling between the two circuits DC and AC is such that the voltage ratio $U_{AW}:V_{C15,16}$ is approximately 10:1 to 20:1. However, this should be regarded as exemplary only. The final values must be determined in each case by experimentation while coordinating the remaining circuit parameters. With the experimental construction, a ratio $V_{AW}:V_{C15,16}$ of 10:1 proves successful at frequency difference $f_{DC0}-f_{AC0}$ of approximately 2–3 MHz.

In all, the course of voltage over the welding electrodes 15 and 16 represented in FIG. 5 is established, taking into consideration FIG. 3 and FIG. 4 as a function of time. The result is thereby achieved that first, with increasing current the welding site is softened, then in this condition at maximum voltage the maximum power is introduced, and then the voltage again falls to a certain value which is, however, not zero. Optimally short welding times $T_0$ may thereby be achieved.

I claim:

1. In high frequency heating apparatus of the kind for welding plastic material, the apparatus comprising
   (i) a stable radio frequency oscillator for providing a fixed frequency output,
   (ii) a power amplifier driven at a fixed frequency derived from the oscillator's output, the power amplifier having a resonant output circuit in which is connected the primary of a transformer,
   (iii) a load circuit comprising a decoupling network connected to welding electrodes, the decoupling network having in it the secondary of the transformer, the welding electrodes being adapted to receive between them the material to be welded, the improvement wherein
   (a) the fixed driving frequency is within the resonance range of the power amplifier's output circuit but below the peak resonant frequency of that circuit in the condition where the material to be welded has not yet been heated to welding temperature,
   (b) the degree of coupling between the primary and secondary of the transformer causes resonance of the power amplifier's output circuit to shift toward lower frequencies in the condition where the material to be welded is heated to welding temperature whereby the peak resonant frequency of the power amplifier's output circuit moves closer to the fixed driving frequency during the welding cycle, and
   (c) the load circuit being resonant at a peak frequency that is dependent upon the state of the material to be welded when disposed between the welding electrodes whereby the peak of resonance of the load circuit shifts to a lower frequency during the welding cycle, the peak resonant frequency of the load circuit at the start of the welding cycle being higher than the peak resonant frequency of the power amplifier's output circuit by an amount greater than the shift in peak resonant frequency of the load circuit during the welding cycle.

2. The improvement according the claim 1, wherein the degree of coupling between the primary and secondary of the transformer is such that the shift in resonance of the load circuit during the welding cycle causes the shift in resonance of the power amplifier's output circuit during the welding cycle to be one half or less of the resonant range of the power amplifier's output circuit.

* * * * *